United States Patent
Metropulos et al.

(10) Patent No.: US 12,441,188 B2
(45) Date of Patent: Oct. 14, 2025

(54) DYNAMICALLY DISPLAYING DRIVER VEHICLE INFORMATION FOR VEHICLES

(71) Applicant: Rivian IP Holdings, LLC, Plymouth, MI (US)

(72) Inventors: Matthew Metropulos, Mountain View, CA (US); Alina Michel, Capitola, CA (US); Eric Ross Baker Wood, Menlo Park, CA (US); Kok Wei Koh, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 316 days.

(21) Appl. No.: 18/091,156

(22) Filed: Dec. 29, 2022

(65) Prior Publication Data

US 2024/0217338 A1    Jul. 4, 2024

(51) Int. Cl.
*B60K 35/00* (2024.01)
*B60K 35/22* (2024.01)
*B60K 35/28* (2024.01)

(52) U.S. Cl.
CPC .............. *B60K 35/00* (2013.01); *B60K 35/22* (2024.01); *B60K 35/28* (2024.01); *B60K 2360/164* (2024.01); *B60K 2360/167* (2024.01)

(58) Field of Classification Search
CPC ........ B60K 35/00; B60K 35/22; B60K 35/28; B60K 2360/164; B60K 2360/167; B60K 35/29; B60K 35/81; B60K 2360/16; B60K 2360/186

See application file for complete search history.

(56) References Cited

U.S. PATENT DOCUMENTS

| | | | |
|---|---|---|---|
| 7,501,939 B1* | 3/2009 | Belikov | G01D 7/005 340/688 |
| 2016/0167513 A1* | 6/2016 | Arita | B60K 35/60 340/441 |
| 2020/0031230 A1* | 1/2020 | Ledermann | B60K 35/10 |
| 2020/0327749 A1* | 10/2020 | Mo | B60K 35/22 |
| 2021/0129672 A1* | 5/2021 | Ahn | B60K 35/658 |
| 2021/0237572 A1* | 8/2021 | Jahns | B60K 35/00 |
| 2021/0237576 A1* | 8/2021 | Jahns | B60K 35/60 |
| 2023/0186690 A1* | 6/2023 | Usami | G07C 5/006 701/29.1 |

* cited by examiner

Primary Examiner — Mussa A Shaawat
(74) Attorney, Agent, or Firm — Patterson + Sheridan, LLP

(57) ABSTRACT

A method for dynamically displaying driver vehicle information within a vehicle is implemented by an in-vehicle computing system. The method includes detecting, by the computing system, in communication with a first display and a second display of the vehicle, that the first display is in a first state. The first display is configured to display driver content. The method further includes determining, by the computing system, a portion of the driver content to be displayed on the second display, and providing, by the computing system, and in response to the first state, at least the portion of the driver content for display on the second display.

19 Claims, 8 Drawing Sheets

DYNAMICALLY DISPLAYING DRIVER VEHICLE INFORMATION FOR VEHICLES

INTRODUCTION

In-vehicle user experience and control systems (e.g., in-vehicle infotainment (IVI) systems) may generally include computing systems that provide entertainment and information monitoring and control to the driver or other passengers of a vehicle by way of one or more computing devices and an associated display. For example, IVI systems may provide and display, for example, notifications, maps, entertainment media (e.g., music, photographs, movies, mobile applications), and user personal data (e.g., phone contacts, emails, multimedia messages) during operation of the vehicle. Similarly, digital instrument cluster systems and associated displays may generally provide and display safety-critical or vehicle-critical information (e.g., current vehicle speed, vehicle energy range) to the driver of the vehicle in accordance with one or more functional safety requirements (FSRs).

BRIEF SUMMARY

Embodiments of the present disclosure are directed toward an in-vehicle control and display system (e.g., in-vehicle infotainment (IVI) system) for dynamically displaying driver vehicle information within a vehicle. Specifically, in accordance with the presently disclosed embodiments, the vehicle may include a multi-display system, which may include an instrument cluster display and an infotainment display. For example, the instrument cluster display may include a dashboard display panel that may be suitable for displaying vehicle speed, battery charge, vehicle charge range, transmission gear indicators, vehicle tire pressure, or other predetermined safety-critical or vehicle-critical driver content during operation of the vehicle. The infotainment display may include an IVI system and display that may be typically utilized to display user content (e.g., infotainment content), such as notifications, maps, entertainment media (e.g., music, photographs, movies, mobile applications), and user personal data (e.g., phone contacts, emails, multimedia messages) during operation of the vehicle.

In certain embodiments, in response to detecting that the instrument cluster display is temporarily or partially inoperable (e.g., in a power "OFF" mode, semi-malfunctional, or otherwise in a state in which one or more regions of pixels of the instrument cluster display 212 are driven to pixel values either too dark or too bright (displaying artifacts), such that the driver content is no longer human-readable), the IVI system and display may determine a portion of the driver content to be displayed by the IVI system and display as opposed to being displayed by the instrument cluster display. For example, in some embodiments, the IVI system and display may temporarily reposition or relocate the display and user interface relating to the user content (e.g., infotainment content) and display only the driver content (e.g., vehicle speed, battery charge, vehicle charge range, transmission gear indication, vehicle tire pressure, or other predetermined safety-critical or vehicle-critical driver content). In another embodiment, the IVI system and display may display the driver content and the user content concurrently.

For example, in some embodiments, the IVI system and display may display the driver content and the user content concurrently by overlaying a pane including only a portion of the driver content (e.g., portion including vehicle speed, battery charge, and transmission gear indication) onto the user content. In other embodiments, the IVI system and display may display the driver content and the user content concurrently by displaying the driver content and the user content as distinct contiguous windows (e.g., in a side-by-side or top-to-bottom layout). Specifically, to display the driver content and the user content as distinct contiguous windows, the IVI system and display may perform one or more processes to reduce an aspect ratio, a resolution, or viewable screen size with respect to one or more displayed objects of the user content or driver content, or to reduce an aspect ratio, a resolution, or a viewable screen size of the entire user content window and/or driver content window.

Accordingly, by providing an IVI system and display that dynamically displays and presents driver content and user content as a failsafe when the instrument cluster display becomes temporarily or partially inoperable, the present embodiments may ensure that safety-critical or vehicle-critical driver content (e.g., vehicle speed, battery charge, vehicle charge range, transmission gear indication, vehicle tire pressure or other predetermined safety-critical or vehicle-critical driver content) is always displayed to the driver of the vehicle in accordance with specified functional safety requirements (FSRs) of the vehicle.

In certain embodiments, a computing system of a vehicle, in communication with a first display and a second display of a vehicle, may detect that the first display is in a first state. In one embodiment, the first display may be configured to display driver content. In certain embodiments, prior to detecting that the first display is in the first state, the computing system may cause the first display to display the driver content. In certain embodiments, detecting that the first display is in the first state may include detecting, by the computing system of the vehicle, that the first display is at least partially inoperable. In one embodiment, the first display may include a digital instrument cluster display. In one embodiment, the second display may include an in-vehicle infotainment (IVI) display. In certain embodiments, the computing system may determine a portion of the driver content to be displayed on the second display. In certain embodiments, the computing system may, in response to the first state, provide at least the portion of the driver content for display on the second display.

In certain embodiments, the computing system may, in response to the first state, cause the second display to display at least the portion of the driver content. In some embodiments, the computing system may cause the second display to display at least the portion of the driver content by causing the second display to display only the portion of the driver content. In other embodiments, the computing system may cause the second display to display at least the portion of the driver content by causing the second display to display the portion of the driver content and user content concurrently. For example, in one embodiment, the computing system may display the portion of the driver content and the user content concurrently by causing the second display to display the portion of the driver content as a partial overlay of the user content.

In another embodiment, the computing system may cause the second display to display the portion of the driver content and the user content concurrently by causing the second display to display the portion of the driver content and the user content as distinct contiguous windows. In certain embodiments, the computing system may cause the second display to display the portion of the driver content and the user content as distinct contiguous windows by causing the second display to adjust an aspect ratio, a resolution, or viewable screen size of the user content. In certain embodiments, the vehicle information may include one or more of a vehicle speed, a vehicle battery charge level, a vehicle energy range, a vehicle fuel level, a vehicle tire pressure, a vehicle energy efficiency, a transmission gear indication, or a map.

The embodiments disclosed above are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
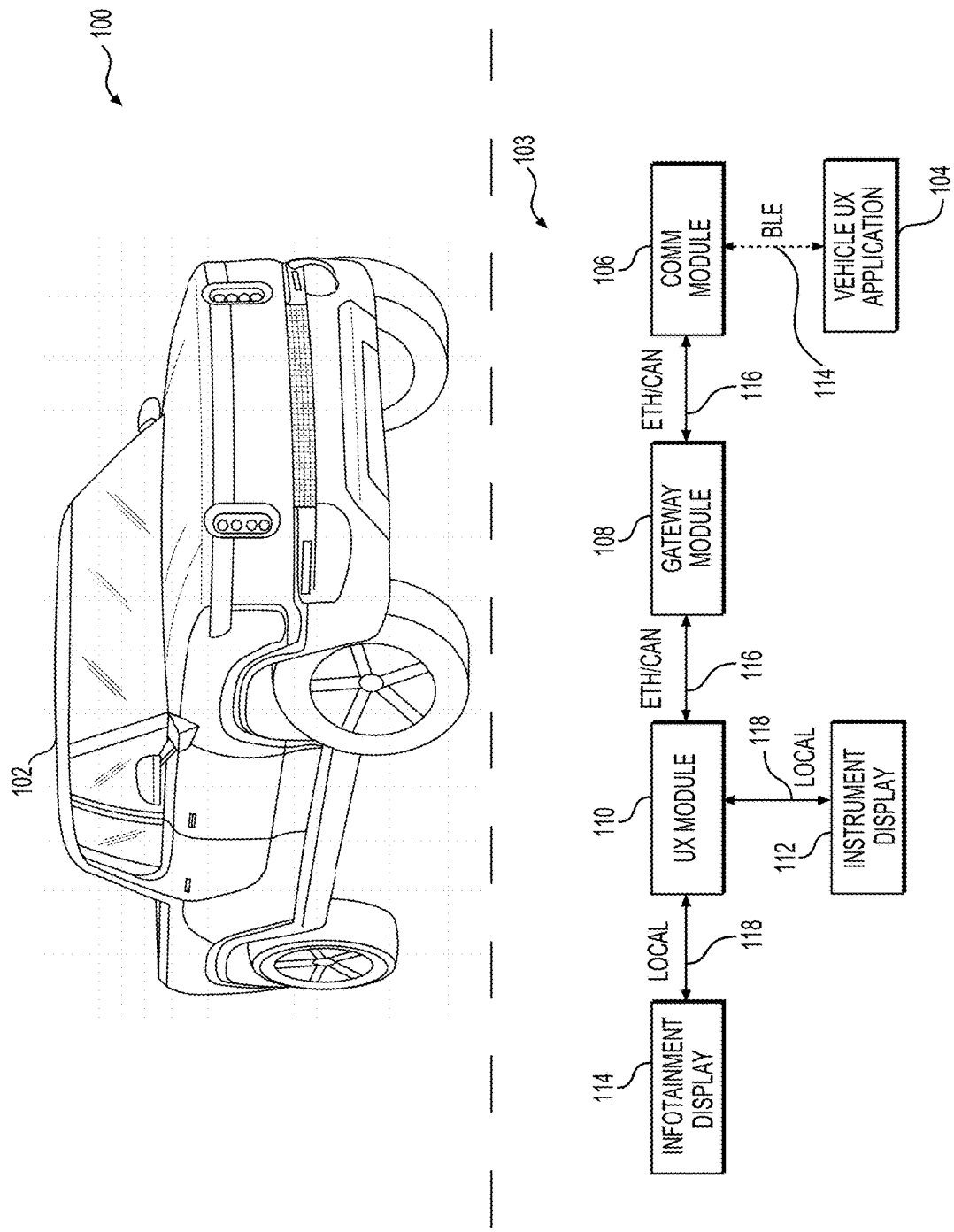
FIG. 1 illustrates an example embodiment of an in-vehicle multi-display and vehicle system for dynamically displaying driver vehicle information within a vehicle.

Embodiments of the present disclosure are directed toward an in-vehicle control and display system (e.g., in-vehicle infotainment (IVI) system) for dynamically displaying driver vehicle information within a vehicle. Specifically, in accordance with the presently disclosed embodiments, the vehicle may include a multi-display system, which may include an instrument cluster display and an infotainment display. For example, the instrument cluster display may include a dashboard display panel that may be suitable for displaying vehicle speed, battery charge, vehicle charge range, transmission gear indicators, vehicle tire pressure, or other predetermined safety-critical or vehicle-critical driver content during operation of the vehicle. The infotainment display may include an IVI system and display that may be typically utilized to display user content (e.g., infotainment content), such as notifications, maps, entertainment media (e.g., music, photographs, movies, mobile applications), and user personal data (e.g., phone contacts, emails, multimedia messages) during operation of the vehicle.

In certain embodiments, in response to detecting that the instrument cluster display is temporarily or partially inoperable (e.g., in a power "OFF" mode, semi-malfunctional, or otherwise in a state in which one or more regions of pixels of the instrument cluster display 112 are driven to pixel values either too dark or too bright (displaying artifacts), such that the driver content is no longer human-readable), the IVI system and display may determine a portion of the driver content to be displayed by the IVI system and display as opposed to being displayed by the instrument cluster display. For example, in some embodiments, the IVI system and display may temporarily reposition or relocate the display and user interface relating to the user content (e.g., infotainment content) and display only the driver content (e.g., vehicle speed, battery charge, vehicle charge range, transmission gear indication, vehicle tire pressure, or other predetermined safety-critical or vehicle-critical driver content). In another embodiment, the IVI system and display may display the driver content and the user content concurrently.

For example, in some embodiments, the IVI system and display may display the driver content and the user content concurrently by overlaying a pane including only a portion of the driver content (e.g., portion including vehicle speed, battery charge, and transmission gear indication) onto the user content. In other embodiments, the IVI system and display may display the driver content and the user content concurrently by displaying the driver content and the user content as distinct contiguous windows (e.g., in a side-by-side or top-to-bottom layout). Specifically, to display the driver content and the user content as distinct contiguous windows, the IVI system and display may perform one or more processes to reduce an aspect ratio, a resolution, or viewable screen size with respect to one or more displayed objects of the user content or driver content, or to reduce an aspect ratio, a resolution, or a viewable screen size of the entire user content window and/or driver content window.

Accordingly, by providing an IVI system and display that dynamically displays and presents driver content and user content as a failsafe when the instrument cluster display becomes temporarily or partially inoperable, the present embodiments may ensure that safety-critical or vehicle-critical driver content (e.g., vehicle speed, battery charge, vehicle charge range, transmission gear indication, vehicle tire pressure or other predetermined safety-critical or vehicle-critical driver content) is always displayed to the driver of the vehicle in accordance with specified functional safety requirements (FSRs) of the vehicle.

FIG. 1 illustrates an example embodiment of an in-vehicle multi-display and vehicle system 100 for dynamically displaying driver vehicle information within a vehicle 102, in accordance with the presently disclosed embodiments. As depicted, the vehicle 102 may include any passenger vehicle (e.g., a car, a truck, a pickup truck, a sports utility vehicle (SUV), a minivan, a crossover utility vehicle (CUV), a cargo van, a towing truck) that may be utilized for transportation and to navigate one or more rural environments, urban environments, and/or off-roading and mountainous environments.

In some embodiments, the vehicle 102 may include a gasoline-powered vehicle that may be propelled, for example, by an internal combustion engine (ICE) or other fuel-injection engine. In other embodiments, the vehicle 102 may include, for example, an electric vehicle (EV), a battery electric vehicle (BEV), a hybrid electric vehicle (HEV), a plug-in hybrid electric vehicle (PHEV), or other vehicle 102 that may be in part or wholly propelled by one or more electric motors (e.g., synchronous electric motors, permanent magnet synchronous electric motors (PMSMs), induction motors (IMs), line start synchronous motors (LSSMs), line start permanent magnet motors (LSPMMs), synchronous reluctance motors (SynRMs)) utilizing power stored to one or more batteries included in the vehicle 102.

In some embodiments, the vehicle 102 may include an autonomous or semi-autonomous vehicle suitable for operating, for example, in accordance with Level-1 autonomous driving, Level-2 autonomous driving, Level-3 autonomous driving, Level-4 autonomous driving, Level-5 autonomous driving, or switching between the different levels of autonomous driving functionality. Further, while the present embodiments may be discussed primarily with respect to the example embodiment of a personal passenger vehicle 102, it should be appreciated that, in other embodiments, the vehicle 102 may be one of a fleet of similar vehicles 102 (e.g., a fleet of delivery vans, a fleet of semi-trailer trucks, a fleet of police vehicles, a fleet of taxis, or a fleet of food-service vehicles).

In certain embodiments, as further depicted by FIG. 1, the vehicle 102 may include a multi-display IVI and instrument cluster system 103. It should be appreciated that, in some embodiments, the IVI and instrument cluster system 103 (e.g., instrument display 112, infotainment display 114) may be coupled to the same electronic control units (ECU) of the vehicle 102. In another embodiment, the IVI and instrument cluster system 103 (e.g., instrument display 112, infotainment display 114) may be each connected to a separate ECU of the vehicle 102.

In certain embodiments, the IVI and instrument cluster system 103 may include any in-vehicle computing system and display that may be suitable for providing and displaying entertainment and information monitoring and control features to a driver or one or more passengers of the vehicle 102. For example, in some embodiments, the IVI and instrument cluster system 103 may include some combination of software, hardware, and middleware that may be suitable for allowing the driver or one or more passengers of the vehicle 102, for example, to stream media content (e.g., audio data, video data, image data, call log data, navigational maps, vehicle data, driver(s) profile data, weather data), enable the use of voice-based and touch-based control of various components and applications (e.g., vehicle 102 driving mode; camera angle and adjustments; mirror angle and adjustments; seating adjustments; vehicle 102 external and internal lighting adjustments; powering the vehicle 102 "ON" or "OFF", locking and unlocking the vehicle 102; windowing opening and closing; trunk, hatch, or tailgate opening and closing; requesting updates from the vehicle 102; pairing with one or more personal electronic devices of the driver or other passengers of the vehicle 102; creating and modifying one or more driver profiles; controlling and managing the settings and functionality of one or more components of the vehicle 102) on the vehicle 102, and together with a telecommunications module 106 allow the vehicle to send and receive over-the-air (OTA) information between the vehicle 102 and one or more external devices (e.g., between vehicle 102 and one or more remote servers, between the vehicle 102 and one or more other vehicles, between the vehicle 102 and the one or more vehicle accessories).

In certain embodiments, the IVI and instrument cluster system 103 may further include any digital instrument cluster system and display that may be suitable for providing and displaying vehicle speed, battery charge level, vehicle charge range, vehicle fuel range, vehicle fuel level, transmission gear indication (e.g., park "P", neutral "N", reverse "R", and drive "D"), vehicle tire pressure, traffic signal indicators, vehicle adaptive cruise control (ACC), vehicle drive mode (e.g., "Efficient", "Comfort", "Sport", "Sport+", and so forth), jurisdictional speed limit, or other safety-critical or vehicle-critical driver content to the driver of the vehicle 102, for example, in accordance with one or more functional safety requirements (FSRs).

As further depicted, in certain embodiments, the IVI and instrument cluster system 103 may include a vehicle user experience ("UX") application 104, a telecommunications module 106, a gateway module 108, a user experience ("UX") module 110, an instrument cluster display 112, and an infotainment display 114. In certain embodiments, the vehicle UX application 104 may be coupled to the telecommunications module 106 utilizing one or more short-range wireless communication networks 114 (e.g., Bluetooth®, Bluetooth® Low Energy (BLE), IPv6 over Low-Power Wireless Personal Area Networks (6LoWPAN), near-field communication (NFC), or other short-range vehicle area network (VAN)). In certain embodiments, the telecommunications module 106 may include a telematics control unit (TCU) that may be utilized, for example, to control wireless tracking, diagnostics, and communication of the vehicle 102 and/or between the vehicle 102 and one or more other components of the vehicle 102 or a remote server associated with the vehicle 102.

In certain embodiments, one or more signals may be passed between the telecommunications module 106 and the gateway module 108 via an Ethernet connection (e.g., Automotive Ethernet), a car area network (CAN), or other high-speed data network 116 that may be included as part of the IVI and instrument cluster system 103. In certain embodiments, the gateway module 108 may include any controller or processor-based device that may be suitable for interconnecting and securely transferring data across the various network connections 116, 118 included as part of the IVI and instrument cluster system 103. For example, in certain embodiments, one or more signals may be passed between the vehicle UX application 104, the telecommunications module 106, the gateway module 108, the UX module 110, and/or the instrument cluster display 112 that may cause the infotainment display 114 (e.g., touch-sensitive display) to display user content (e.g., infotainment content) along with safety-critical or vehicle-critical driver content (e.g., vehicle speed, battery charge level, vehicle charge range, vehicle fuel level, vehicle fuel range, transmission gear indication, or other predetermined safety-critical vehicle-critical driver content).

For example, as will be further illustrated with respect to FIGS. 2A-2B and 3A-3B below, in some embodiments, upon detecting that the instrument cluster display 112 is temporarily or partially inoperable (e.g., in a power "OFF" mode, semi-malfunctional, or otherwise in a state in which one or more regions of pixels of the instrument cluster display 112 are driven to pixel values either too dark or too bright (displaying artifacts), such that the driver content is no longer human-readable), the gateway module 108 may determine a portion of the driver content to be displayed by the infotainment display 114 as opposed to being displayed by the instrument cluster display 112.

FIGS. 2A-2B and 3A-3B illustrates example user interfaces 200A, 200B, 300A, and 300B for dynamically displaying driver vehicle information within a vehicle 102, in accordance with the presently disclosed embodiments. Specifically, the example user interface 200A of FIG. 2A may include a daytime version of redisplayed driver content on the infotainment display 114, the example user interface 200B of FIG. 2B may include a nighttime version of redisplayed driver content on the infotainment display 114, the example user interface 300A of FIG. 3A may include user content and driver content displayed concurrently (e.g., in a side-by-side or top-to-bottom layout), and the example user interface 300B of FIG. 3B may include a portion of driver content overlaying user content displayed on the infotainment display 114.

Figure 2A:
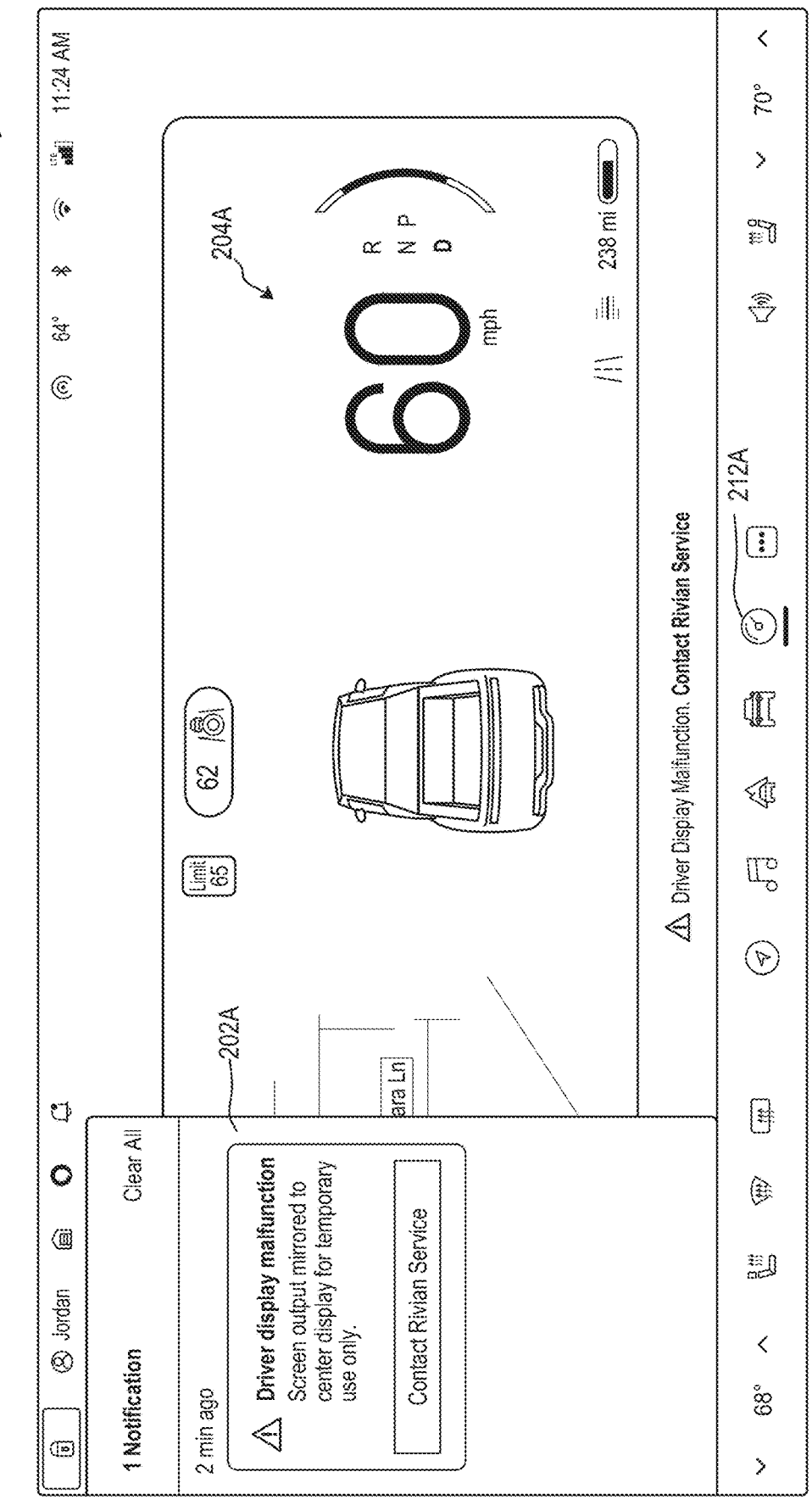
FIGS. 2A-2B and 3A-3B illustrates example user interfaces for dynamically displaying driver vehicle information within a vehicle.
Figure 2B:
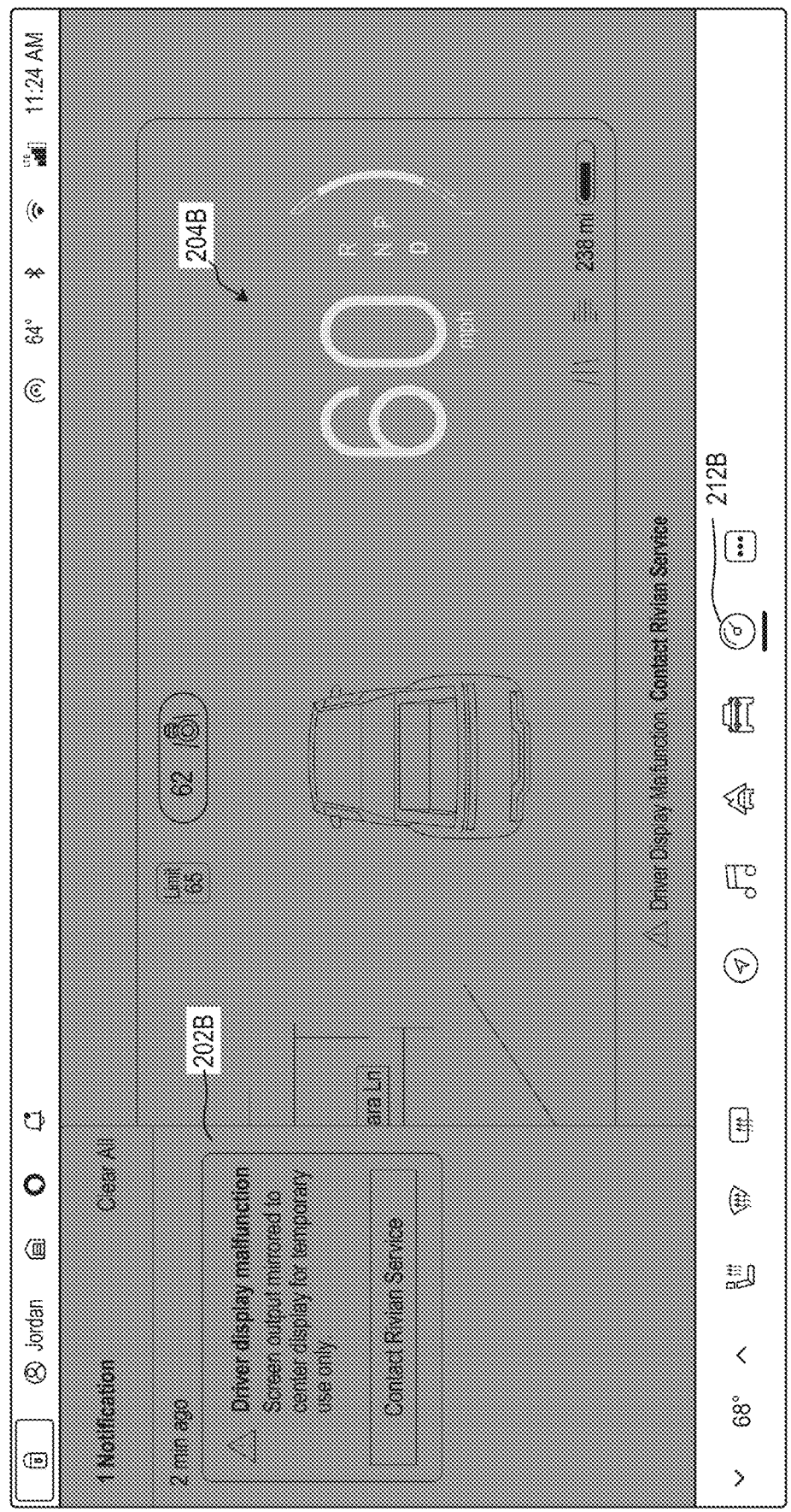

For example, as depicted by the example user interface 200A of FIG. 2A and the example user interface 200B of FIG. 2B, a notification 202A, 202B may be displayed alerting the driver, for example, that the instrument cluster display 112 has been detected as being temporarily or partially inoperable. Thus, in certain embodiments, the infotainment display 114 may display driver content 204A, 204B. As further depicted, in some embodiments, the driver content 204A, 204B may include any safety-critical or vehicle-critical driver content (e.g., vehicle speed, battery charge level, vehicle charge range, vehicle fuel level, vehicle fuel range, transmission gear indication, or other predetermined safety-critical vehicle-critical driver content) that may be displayed to the driver of the vehicle 102 during operation.

In one embodiment, the driver content 204A, 204B as displayed by the example user interface 200A and the example user interface 200B may include an application separate and distinct from any user content application as shown in the application drawer 210A, for example. Specifically, in one embodiment, in response to detecting the instrument cluster display 112 as being temporarily or partially inoperable, the processing unit automatically generates a new driver content application and user interface 204A, 204B that displays safety-critical or vehicle-critical driver content 204A, 204B (e.g., vehicle speed, battery charge level, vehicle charge range, vehicle fuel level, vehicle fuel range, transmission gear indication, or other predetermined safety-critical vehicle-critical driver content). For example, the new driver content application and user interface 304A, 304B is automatically generated and populated together with a new application icon 212A within the application drawer 210A of the infotainment display 200A. As further depicted by the example user interface 200A and the example user interface 200B, in some embodiments, in addition to the driver content 204A, 204B, the infotainment display 114 may include a rendering of the vehicle 102 along with speed limit data.

In other embodiments, in response to detecting the instrument cluster display 112 as being temporarily or partially inoperable, the infotainment display 114 may display user content (e.g., infotainment content) and driver content 204A, 204B (e.g., vehicle speed, battery charge level, vehicle charge range, vehicle fuel level, vehicle fuel range, transmission gear indication, or other predetermined safety-critical vehicle-critical driver content) concurrently. For example, in one embodiment, as depicted by the example user interface 300A of FIG. 3A, the infotainment display 114 may display user content 306A (e.g., infotainment content) juxtaposed with the driver content 304A as contiguous window panes (e.g., in a side-by-side or top-to-bottom layout).

For example, in some embodiments, in response to detecting the instrument cluster display 112 as being temporarily or partially inoperable, instructions are generated by the processing unit (e.g., gateway module 108, experience management module (XMM) ECU, central gateway module (CGM) ECU, or other similar ECU) so as to cause the infotainment display 114 to reduce, for example, the aspect ratio, the resolution, or the viewable screen size of the user content 306A (e.g., infotainment content) and/or the driver content 304A, such that the user content 306A (e.g., infotainment content) and driver content 304A may be displayed concurrently. For example, reducing the aspect ratio, resolution, or viewable screen size may generally include resizing one or more objects (e.g., an area of each object, an alphanumeric font size or font type, a position of each object, and so forth) of the user content 306A or the driver content 304A.

Figure 3A:
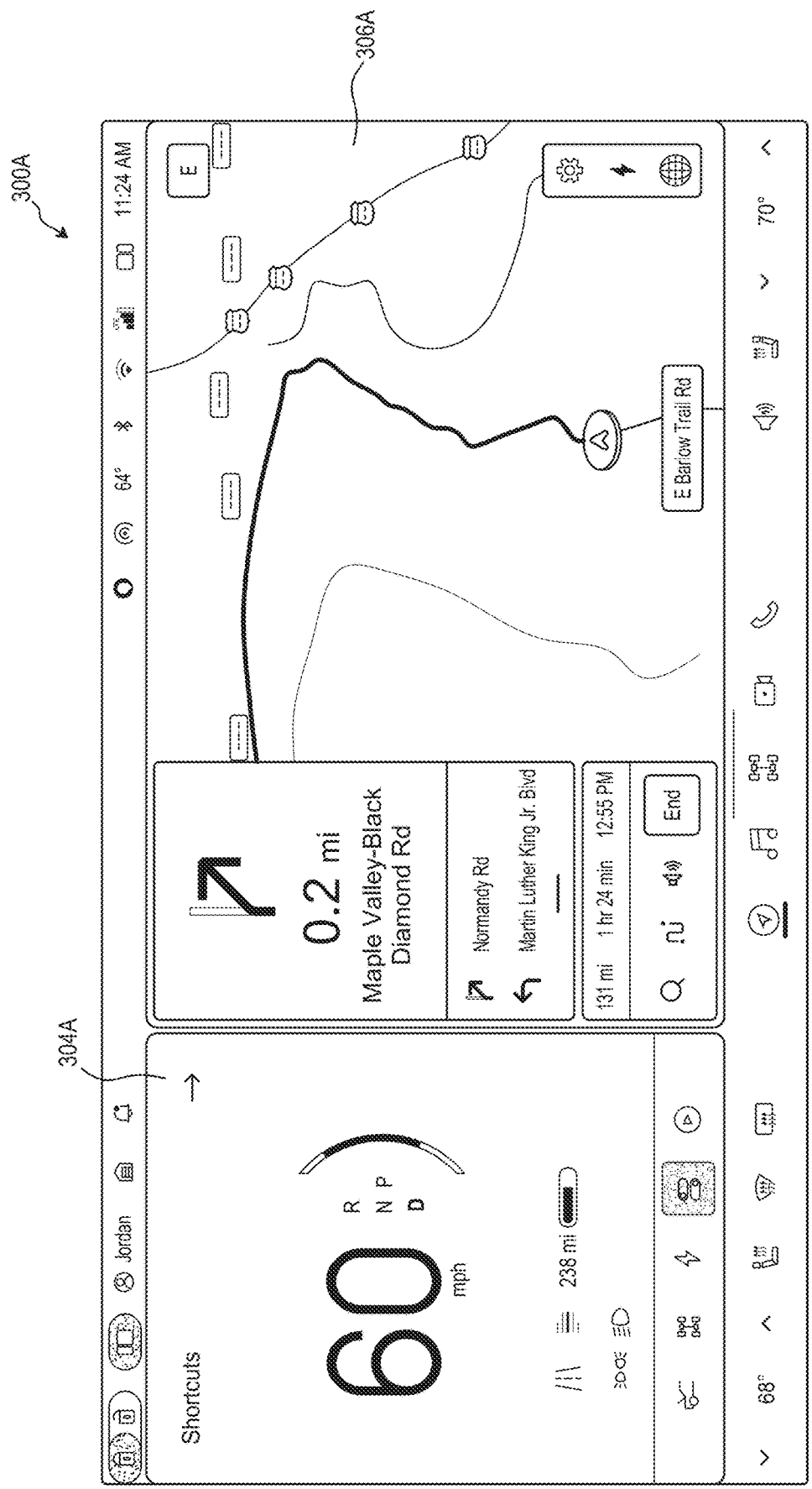
Figure 3B:
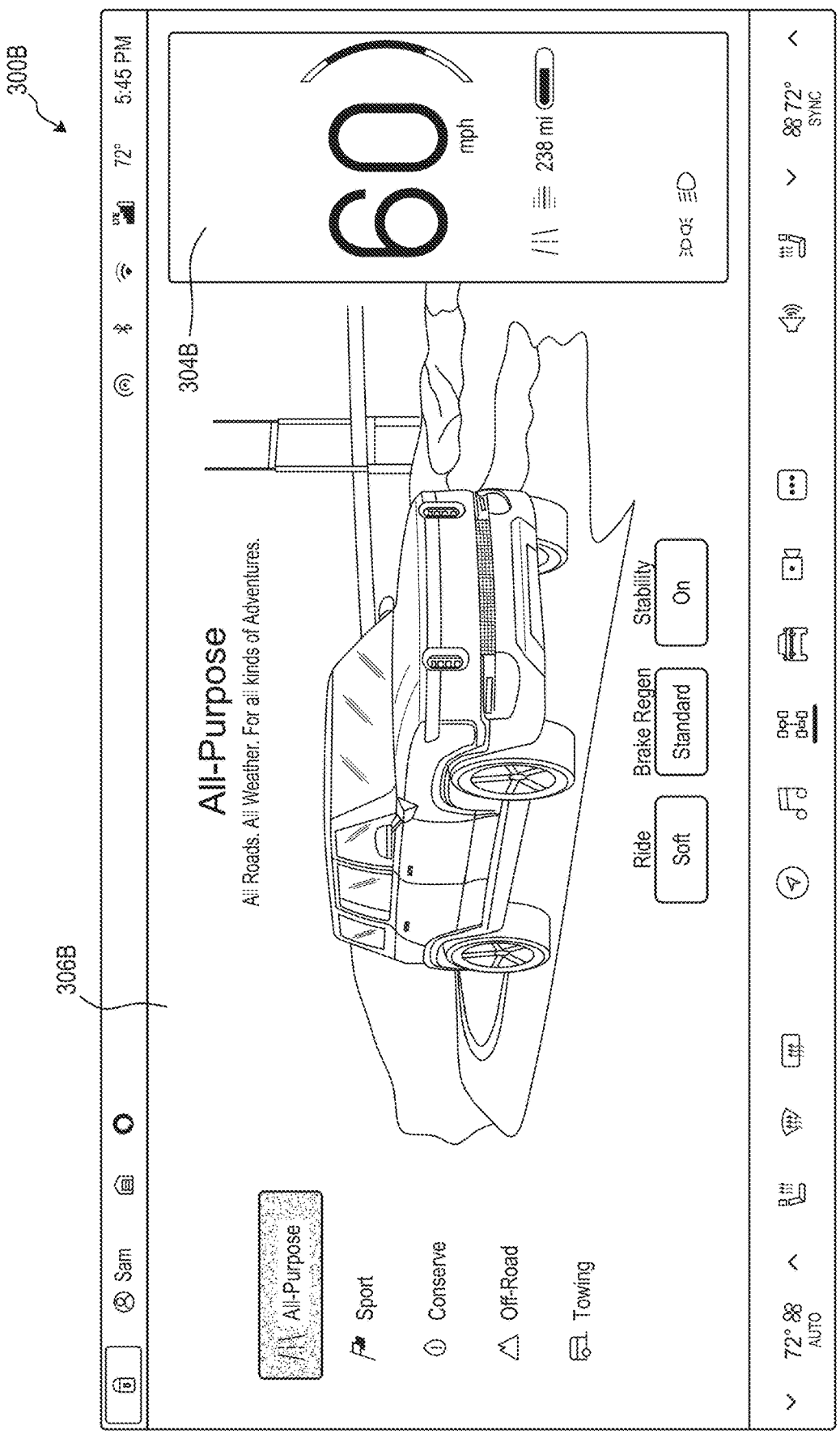

In certain embodiments, as further depicted by the example user interface 300A of FIG. 3A, the driver content 304A may be displayed as an overlapping display panel on a side (e.g., left side or driver side) of the infotainment display 114 closest to the driver of the vehicle 102 to facilitate driver viewing. In certain embodiments, as further depicted by the example user interface 300A of FIG. 3A, the driver content 304A window may include only a portion of the driver content 204A, 204B discussed above with respect to the example user interface 200A of FIG. 2A and the example user interface 200B of FIG. 2B. Specifically, in accordance with the presently disclosed embodiments, only driver content 304A (e.g., vehicle speed, battery charge level, vehicle charge range, vehicle fuel level, vehicle fuel range, transmission gear indication, or other predetermined safety-critical vehicle-critical driver content) prespecified as being safety-critical or vehicle-critical in accordance with one or more FSRs associated with the vehicle 102 may be displayed in the driver content 304A window.

In certain embodiments, in response to detecting the instrument cluster display 112 as being temporarily or partially inoperable, the infotainment display 114 may further display user content 306B (e.g., infotainment content) and driver content 304B (e.g., vehicle speed, battery charge level, vehicle charge range, vehicle fuel level, vehicle fuel range, transmission gear indication, or other predetermined safety-critical vehicle-critical driver content) concurrently by partially overlaying the driver content 304B over the user content 306B within a newly generated window panel of the infotainment display 114. Specifically, as depicted by the example user interface 300B of FIG. 3B, in some embodiments, the driver content 304B may be displayed as a pane, for example, along one or more edges of the infotainment display 114, such that the driver content 304B (e.g., vehicle speed, battery charge level, vehicle charge range, vehicle fuel level, vehicle fuel range, transmission gear indication, or other predetermined safety-critical vehicle-critical driver content) is displayed in a foreground with respect to the displayed user content 306B (e.g., infotainment content).

In some embodiments, the driver content 304B pane may be a floating window that may be positioned by the driver with respect to the user content 306B (e.g., infotainment content) by performing one or more user gestures (e.g., touch and drag, swipe, pinch and zoom, and so forth) on the infotainment display 114. In one embodiment, while displayed concurrently, the user content 306B (e.g., infotainment content) may be collapsed or minimized, while the driver content 304B pane may not be collapsed or minimized. Accordingly, by providing an infotainment display 114 that dynamically displays and presents driver content 304 and user content 306 as a failsafe when the instrument cluster display 112 becomes temporarily or partially inoperable, the present embodiments may ensure that safety-critical or vehicle-critical driver content (e.g., vehicle speed, battery charge, vehicle charge range, transmission gear indication, or other predetermined safety-critical or vehicle-critical driver content) is always displayed to the driver of the vehicle 102 in accordance with one or more FSRs of the vehicle 102.

Figure 4:
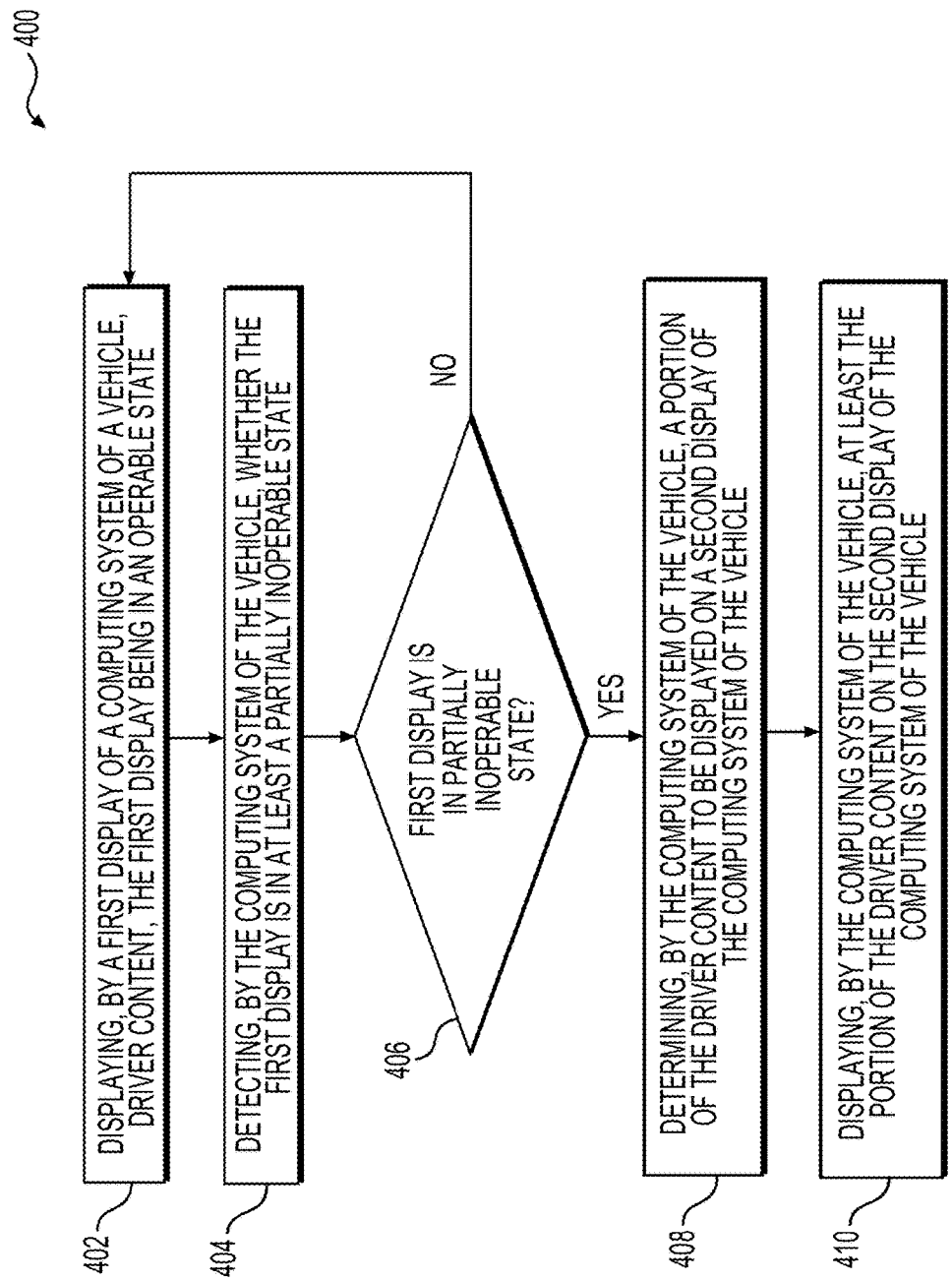
FIG. 4 illustrates a flow diagram of a method for dynamically displaying driver vehicle information within a vehicle.

FIG. 4 illustrates a flow diagram of a method 400 for dynamically displaying driver vehicle information within a vehicle 102, in accordance with the presently disclosed embodiments. The method 400 may be performed utilizing one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), or any other processing device(s) that may be suitable for processing various vehicle data and making one or more decisions based thereon), software (e.g., instructions running/executing on one or more processors), firmware (e.g., microcode), or some combination thereof.

The method 400 may begin at block 402 with one or more processing devices displaying, on a first display of a computing system of a vehicle, driver content, in which the first display is in an operable state. For example, in one embodiment, the first display may include an instrument cluster display panel that may display, for example, vehicle speed, battery charge, vehicle charge range, and so forth. The method 400 may continue at block 404 with the one or more processing devices detecting, by the computing system of the vehicle, whether the first display is in at least a partially inoperable state. For example, in one embodiment, the instrument cluster display panel may temporarily cease or at least partially cease displaying the driver content (e.g., vehicle speed, battery charge, vehicle charge range, and so forth).

The method 400 may then continue at decision 406 with the one or more processing devices, in response to detecting that the first display is in at least a partially inoperable state, the method 400 may continue at block 408 with the one or more processing devices determining, by the computing system of the vehicle, a portion of the driver content to be displayed by a second display of the computing system of the vehicle. For example, in one embodiment, the second display may include IVI system display typically utilized for displaying user content (e.g., infotainment content), such as notifications, maps, entertainment media (e.g., music, photographs, movies, mobile applications), and user personal data (e.g., phone contacts, emails, multimedia messages) during operation of the vehicle 102.

The method 400 may then continue at block 410 with the one or more processing devices displaying, by the computing system of the vehicle, the portion of the driver content on the second display of the computing system of the vehicle. For example, in one embodiment, the second display may display the driver content (e.g., vehicle speed, battery charge, vehicle charge range, and so forth) concurrently with the user content (e.g., notifications, maps, entertainment media, user personal data, and so forth). In another embodiment, the second display may temporarily reposition or relocate the display and user interface relating to user content (e.g., notifications, maps, entertainment media, user personal data, and so forth) and display only the driver content (e.g., vehicle speed, battery charge, vehicle charge range, and so forth). In another embodiment, the second display may continue displaying the user content (e.g., notifications, maps, entertainment media, user personal data, and so forth) and display the driver content (e.g., vehicle speed, battery charge, vehicle charge range, and so forth) as partially overlaying the user content. In certain embodiments, in response to detecting that the first display is in an operable state, the method 400 may return to block 402, in accordance with the presently disclosed embodiments.

Figure 5:
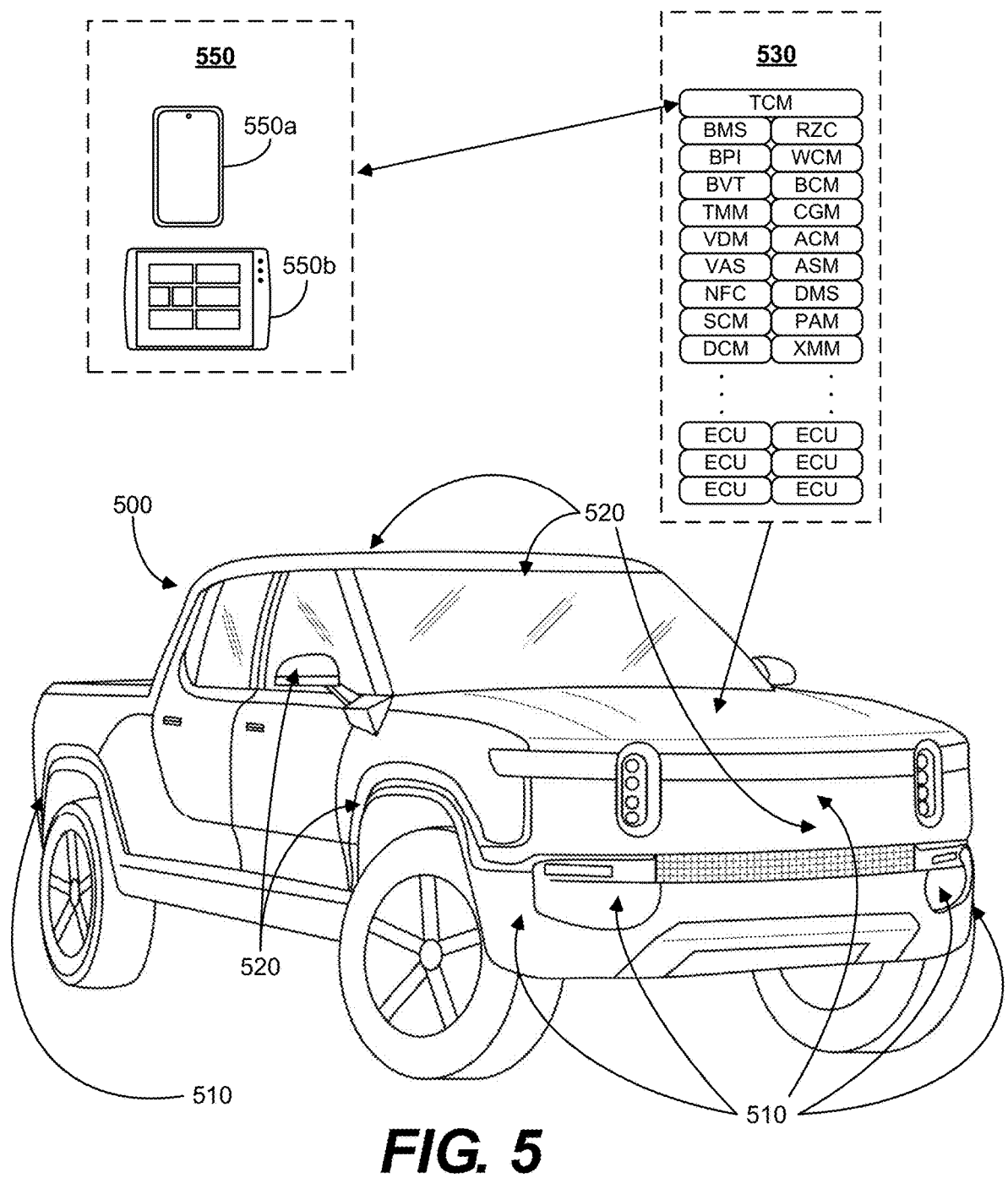
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550*a*, tablet computing device 550*b*, or a smart vehicle accessory). As an example and not by way of limitation, a sensor 510 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof.

As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Control system 530 may enables control of various systems on-board the vehicle. As shown in FIG. 5, control system 530 may comprise one or more electronic control units (ECUs), each of which are dedicated to a specific set of functions. Each ECU may be a computer system (as described further in FIG. 6), and each ECU may include functionality provide by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 550, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 530. In some embodiments, functions of the ACM and the XMM may be combined together into an Autonomous eXperience Module (AXM) ECU.

Vehicle 500 may include one or more additional ECUs, such as, by way of example and not limitation: a Central Gateway Module (CGM) ECU, a Telematics Control Module (TCM) ECU, a Vehicle Dynamics Module (VDM) ECU, an Experience Management Module (XMM) ECU, a Vehicle Access System (VAS) ECU, a Near-Field Communication (NFC) ECU, and/or a Body Control Module (BCM) ECU.

Figures 6A, 6B:
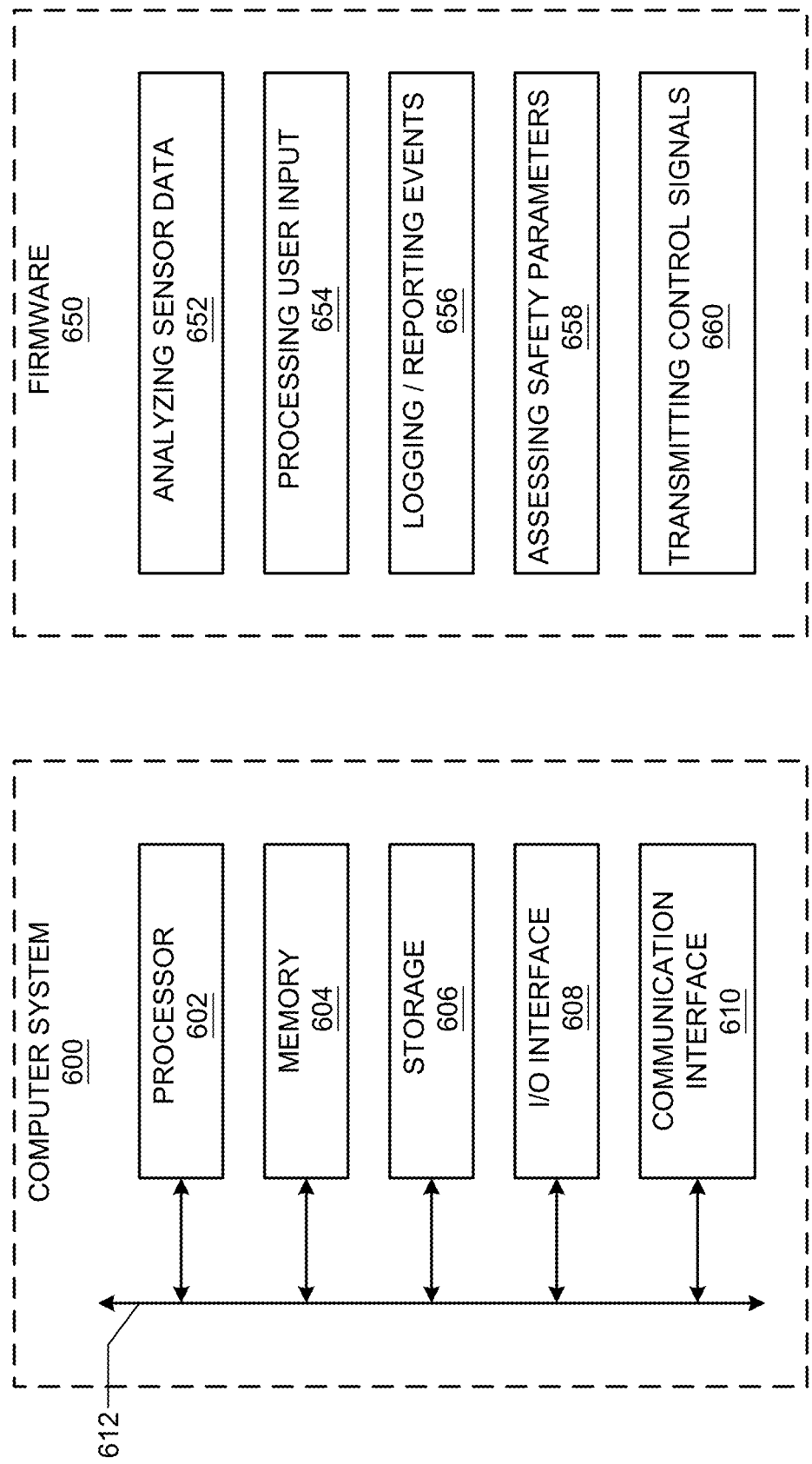
FIG. 6A is a schematic of an example computer system.
FIG. 6B illustrates example firmware for a vehicle ECU.

FIG. 6A illustrates an example computer system 600. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed, span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. Processor 602 may include one or more internal caches for data, instructions, or addresses.

In certain embodiments, memory 604 includes main memory for storing instructions for processor 602 to execute or data for processor 602 to operate on. In certain embodiments, one or more memory management units (MMUs) reside between processor 602 and memory 604 and facilitate accesses to memory 604 requested by processor 602. In certain embodiments, memory 604 includes random access memory (RAM). This disclosure contemplates any suitable RAM.

In certain embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In certain embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 600 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In certain embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In certain embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 6B illustrates example firmware 650 for a vehicle ECU 600 as described with respect to control system 530. Firmware 650 may include functions 652 for analyzing sensor data based on signals received from sensors 510 or cameras 520 received through communication interface 610. Firmware 650 may include functions 654 for processing user input (e.g., directly provided by a driver of or passenger in vehicle 500, or provided through a computing device 550) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). Firmware 650 may include functions 658 for assessing safety parameters (e.g., monitoring the temperature of a vehicle battery or the distance between vehicle 500 and nearby vehicles). Firmware 650 may include functions 660 for transmitting control signals to components of vehicle 500, including other vehicle ECUs 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method for dynamically displaying driver vehicle information in a vehicle, the method comprising:
   detecting, by a computing system of the vehicle, in communication with a first display and a second display of the vehicle, that the first display is in a first state in which the first display is temporarily or at least partially inoperable, wherein the first display is configured to display driver content;
   determining, by the computing system of the vehicle, a portion of the driver content to be displayed on the second display; and
   providing, by the computing system of the vehicle, and in response to detecting the first state, at least the portion of the driver content for display on the second display.

2. The method of claim 1, wherein the first display comprises a digital instrument cluster display.

3. The method of claim 1, wherein the second display comprises an in-vehicle infotainment (IVI) display.

4. The method of claim 1, further comprising causing, by the computing system of the vehicle, and in response to the first state, the second display to display at least the portion of the driver content.

5. The method of claim 4, wherein causing the second display to display at least the portion of the driver content further comprises causing, by the computing system of the vehicle, the second display to display only the portion of the driver content.

6. The method of claim 4, wherein causing the second display to display at least the portion of the driver content further comprises causing, by the computing system of the vehicle, the second display to display the portion of the driver content and user content concurrently.

7. The method of claim 6, wherein causing the second display to display the portion of the driver content and the user content concurrently further comprises causing, by the computing system of the vehicle, the second display to display the portion of the driver content as a partial overlay of the user content.

8. The method of claim 6, wherein causing the second display to display the portion of the driver content and the user content concurrently further comprises causing, by the computing system of the vehicle, the second display to display the portion of the driver content and the user content as distinct contiguous windows.

9. The method of claim 8, wherein causing the second display to display the portion of the driver content and the user content as distinct contiguous windows further comprises causing, by the computing system of the vehicle, the second display to adjust an aspect ratio, a resolution, or a viewable screen size of the driver content or the user content.

10. The method of claim 1, wherein the driver content comprises one or more of a vehicle speed, a vehicle battery charge level, a vehicle charge range, a vehicle fuel level, a vehicle fuel range, a vehicle tire pressure, a vehicle energy efficiency, a transmission gear indication, or a map.

11. The method of claim 1, further comprising:
prior to detecting that the first display is in the first state, causing, by the computing system of the vehicle, the first display to display the driver content.

12. A non-transitory computer-readable medium comprising instructions that, when executed by one or more processors of one or more computing devices, cause the one or more processors to:
detect, by a computing system of a vehicle, in communication with a first display and a second display of the vehicle, that the first display is in a first state in which the first display is temporarily or at least partially inoperable, wherein the first display is configured to display driver content;
determine, by the computing system of the vehicle, a portion of the driver content to be displayed on the second display; and
provide, by the computing system of the vehicle, and in response to detecting the first state, at least the portion of the driver content for display on the second display.

13. The non-transitory computer-readable medium of claim 12, wherein the instructions further comprise instructions to cause, by the computing system of the vehicle, and in response to the first state, the second display to display at least the portion of the driver content.

14. The non-transitory computer-readable medium of claim 13, wherein the instructions to cause the second display to display at least the portion of the driver content further comprise instructions to cause, by the computing system of the vehicle, the second display to display only the portion of the driver content.

15. The non-transitory computer-readable medium of claim 13, wherein the instructions to cause the second display to display at least the portion of the driver content further comprise instructions to cause, by the computing system of the vehicle, the second display to display the portion of the driver content and user content concurrently.

16. The non-transitory computer-readable medium of claim 15, wherein the instructions to cause the second display to display the portion of the driver content and the user content concurrently further comprise instructions to cause, by the computing system of the vehicle, the second display to display the portion of the driver content as a partial overlay of the user content.

17. The non-transitory computer-readable medium of claim 15, wherein the instructions to cause the second display to display the portion of the driver content and the user content concurrently further comprise instructions to cause, by the computing system of the vehicle, the second display to display the portion of the driver content and the user content as distinct contiguous windows.

18. The non-transitory computer-readable medium of claim 17, wherein the instructions to cause the second display to display the portion of the driver content and the user content as distinct contiguous windows further comprise instructions to cause, by the computing system of the vehicle, the second display to adjust an aspect ratio, a resolution, or a viewable screen size of the driver content or the user content.

19. A computing system for a vehicle, the computer system comprising:
one or more non-transitory computer-readable storage media including instructions; and
one or more processors coupled to the one or more non-transitory computer-readable storage media, the one or more processors configured to execute the instructions to:
detect, by the computing system, in communication with a first display and a second display of the vehicle, that the first display is in a first state in which the first display is temporarily or at least partially inoperable, wherein the first display is configured to display driver content;
determine, by the computing system, a portion of the driver content to be displayed on the second display; and
provide, by the computing system, and in response to detecting the first state, at least the portion of the driver content for display on the second display.

\* \* \* \* \*